US012115694B2

(12) United States Patent
McCrory et al.

(10) Patent No.: US 12,115,694 B2
(45) Date of Patent: Oct. 15, 2024

(54) GROUND DETECTION SYSTEM FOR ULTRASONIC CUTTING

(71) Applicant: Lockheed Martin Corporation, Bethesda, MD (US)

(72) Inventors: Christopher Sean McCrory, Fort Worth, TX (US); Matthew Timothy McKee, Fort Worth, TX (US); Matthew Short, Wilmington, OH (US); Lance Cronley, Mount Victory, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/342,476

(22) Filed: Jun. 27, 2023

(65) Prior Publication Data

US 2023/0339134 A1 Oct. 26, 2023

Related U.S. Application Data

(62) Division of application No. 16/737,008, filed on Jan. 8, 2020, now Pat. No. 11,717,980.

(51) Int. Cl.
*B26D 7/08* (2006.01)
*B26D 7/02* (2006.01)

(52) U.S. Cl.
CPC ............ *B26D 7/086* (2013.01); *B26D 7/025* (2013.01)

(58) Field of Classification Search
CPC ........... B26D 7/086; B26D 7/025; B26D 7/22
See application file for complete search history.

(56) References Cited

U.S. PATENT DOCUMENTS

| | | | |
|---|---|---|---|
| 3,734,382 | A | 5/1973 | Spanjer |
| 5,026,387 | A | 6/1991 | Thomas |
| 5,935,143 | A | 8/1999 | Hood |
| 6,588,277 | B2 | 7/2003 | Giordano et al. |
| 6,667,625 | B1 | 12/2003 | Miller |
| 7,648,462 | B2 | 1/2010 | Jenkins et al. |
| 8,372,099 | B2 | 2/2013 | Deville et al. |
| 2019/0287941 | A1 | 9/2019 | Maruya et al. |

OTHER PUBLICATIONS

Model 170 Ultrasonic Disk Cutter Instruction Manual, http://www.labmet.cl/Documentos/Manuales/Manual%2-%20ULTRASONIC%20DISK%20CUTTER%20MODEL%20170.PDF, dated Oct. 2, 2019.

*Primary Examiner* — George R Koch
*Assistant Examiner* — Christopher C Caillouet
(74) *Attorney, Agent, or Firm* — Baker Botts L.L.P.

(57) ABSTRACT

In one embodiment, systems and methods include using an ultrasonic cutter in a ground detection system to prevent damage to a substrate. The method of detecting a substrate comprises attaching a workpiece clamp to the substrate. The method further comprises cutting a layer of coating disposed on the substrate with an ultrasonic cutter, wherein the ultrasonic cutter operates at a frequency of about 20 kHz to about 40 kHz, wherein the layer of coating is non-conductive. The method further comprises contacting the substrate with the ultrasonic cutter.

18 Claims, 3 Drawing Sheets

GROUND DETECTION SYSTEM FOR ULTRASONIC CUTTING

CROSS-REFERENCE TO RELATED APPLICATION

This application is a divisional application of U.S. application Ser. No. 16/737,008 filed Jan. 8, 2020, and entitled "Ground Detection System for Ultrasonic Cutting," which is herein incorporated by reference in its entirety.

TECHNICAL FIELD

This disclosure generally relates to surface coatings, and more specifically to aground detection system for coatings when utilizing an ultrasonic cutter.

BACKGROUND

Coatings of various types may be applied to surfaces of structures and vehicles to alter or enhance properties of respective surfaces. For example, some coatings may be applied to provide a weather-resistant layer to protect the underlaying structure. As another example, a coating may be applied to reduce vibrations or other deleterious effects during operation of an aircraft.

These coatings may be applied to one or more panels prior to installing said panels to the aircraft. Typically, there are predrilled holes in the one or more panels for fastener installation. In order to maximize efficiency, the coatings have been applied first over the one or more panels, and then the coatings covering the predrilled holes have been cut out. There exists a problem wherein an operator cuts through the coatings and damages the substrate of the one or more panels.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1A through 4, where like numbers are used to indicate like and corresponding parts.

As described, surface coatings may be applied onto one or more panels prior to installing the one or more panels onto an aircraft. It may be difficult to accurately remove the coatings covering the holes present in the one or more panels without damaging the one or more panels. Described herein are various systems and methods that provide reduction in damage to the one or more panels by using a ground detection system.

Figure 1A:
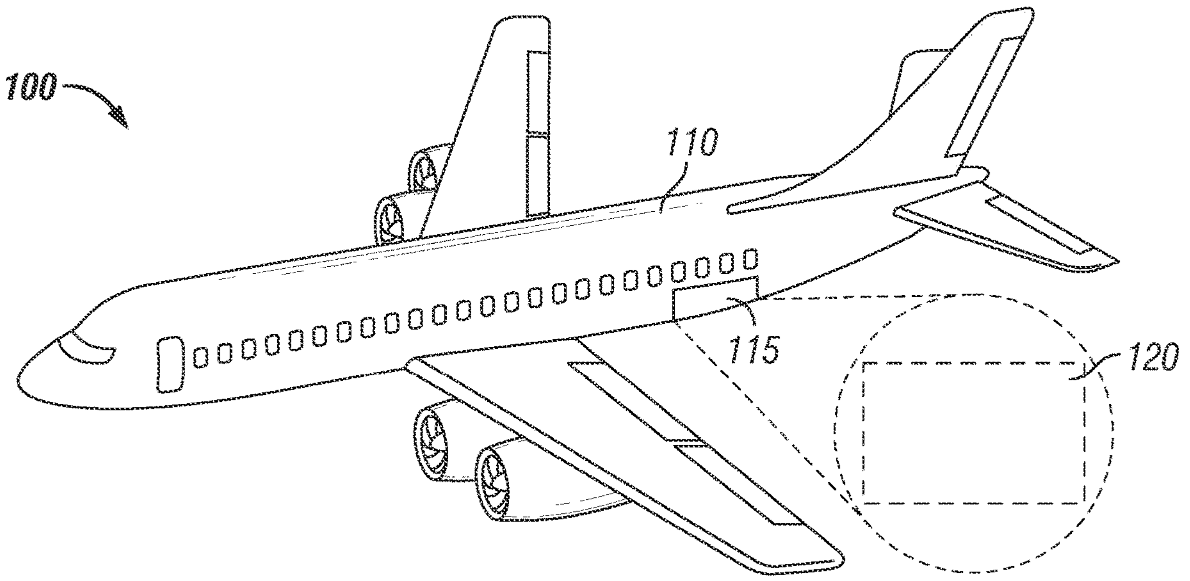
FIG. 1A illustrates an example vehicle onto which a surface coating is applied, according to certain embodiments.

FIG. 1A illustrates an example vehicle 100 having a surface 110. Surface 110 may include a portion 115 onto which a surface coating may be applied. For example, a surface coating may be applied to surface 110 to protect surface 110 and vehicle 100 from operational conditions and/or weather. In one or more embodiments, portion 115 may comprise one or more panels 120 coupled together to form the surface 110. In these embodiments, the surface coating may be applied to the one or more panels 120 before assembly.

Figure 1B:
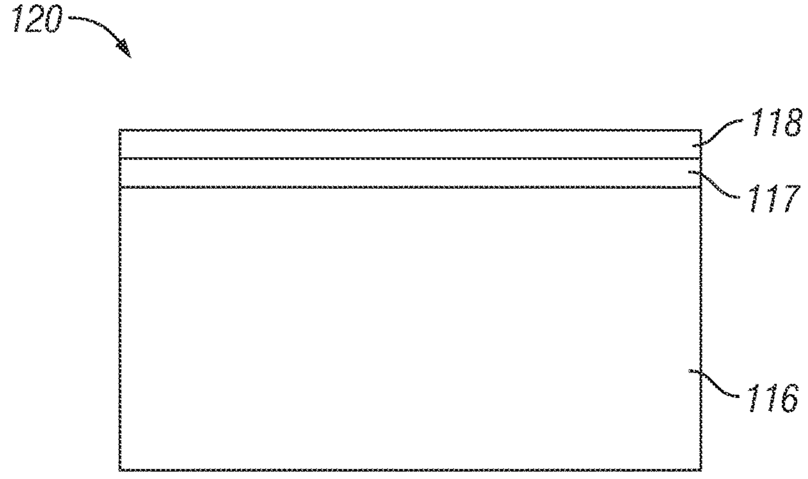
FIG. 1B illustrates a cross-section of a surface of the vehicle in FIG. 1A, according to certain embodiments.

FIG. 1B illustrates a cross-section of one of the one or more panels 120 to be disposed onto vehicle 100 (referring to FIG. 1A). The one or more panels 120 may include one or more layers, coatings, paints, adhesives, and combinations thereof. As shown in the illustrated example, the one or more panels 120 may comprise a substrate 116, a first layer 117, and a second layer 118. In some embodiments, substrate 116 may be a base layer of coating applied to surface 110 (referring to FIG. 1A) or may be the outer layer of surface 110. For example, substrate 116 may be the outer metallic or ceramic skin of an aircraft. As another example, substrate 116 may be a coating layer applied to surface 110 prior to applying first layer 117 and/or second layer 118.

In certain embodiments, first layer 117 may be applied on top of substrate 116. Without limitations, first layer 117 may be configured to conductive or non-conductive. In certain embodiments, second layer 118 may be applied on top of first layer 117. Without limitations, second layer 118 may be configured to conductive or non-conductive. In examples, the second layer 118 may be a top coating applied to a car, airplane, etc. The top coating may protect the underlying layers of paint and the body of a car from corrosion, e.g., due to water, chemical/light, or physical damage. For example, the top coating may repel stains from acid rain, bird droppings or pollen and/or prevent ice and snow adhesion in wintery conditions. In this manner, second layer 118 may protect surface 110 and provide additional benefits to vehicle 100. In alternate embodiments, the one or more panels 120 may not comprise the second layer 118. In those embodiments, the first layer 117 performs the operational services previously attributed to second layer 118.

In certain embodiments, portion 115 (referring to FIG. 1A) of surface 110 may include additional layers. For example, further performance coatings, in addition to second layer 118, may be applied to surface 110. Different performance coatings may have different functions that each enhance the operation of vehicle 100. In some embodiments, one or more additional layers may be disposed over surface 110.

In certain embodiments, different portions of surface 110 have applied different performance coatings and other layers. For example, certain portions of surface 110 may have more or fewer coatings and/or layers applied based on the location of that portion of surface 110 and/or the characteristics of the operational environment proximate that portion of surface 110. In this manner, different locations or applications may be configured with varying degrees of coating thickness.

While the example of vehicle 100 will be used throughout this disclosure as an example application of the methods and systems described herein, any suitable apparatus or structure onto which a surface coating may be applied is also contemplated in this disclosure. For example, vehicle 100 may be any type of vehicle, including an aircraft, a landcraft, a watercraft, a train, a hovercraft, and a helicopter. Further, certain embodiments may be applicable to surface coatings applied to stationary structures, such as buildings or other structures exposed to weather or other operational conditions.

In one or more embodiments, the deposition of the first layer 117, second layer 118, additional layers, coatings, and combinations thereof may occur prior to installing the one or more panels 120 onto the vehicle 100. In embodiments, there may be predrilled holes disposed throughout each of the one or more panels 120 for future use as fastener installation. As the collective layers and/or coatings are deposited onto the one or more panels 120, the predrilled holes may be covered by the layers and/or coatings. In embodiments, the layers and/or coatings disposed in the area over the predrilled holes may be removed in order to utilize those predrilled holes.

Figure 2:
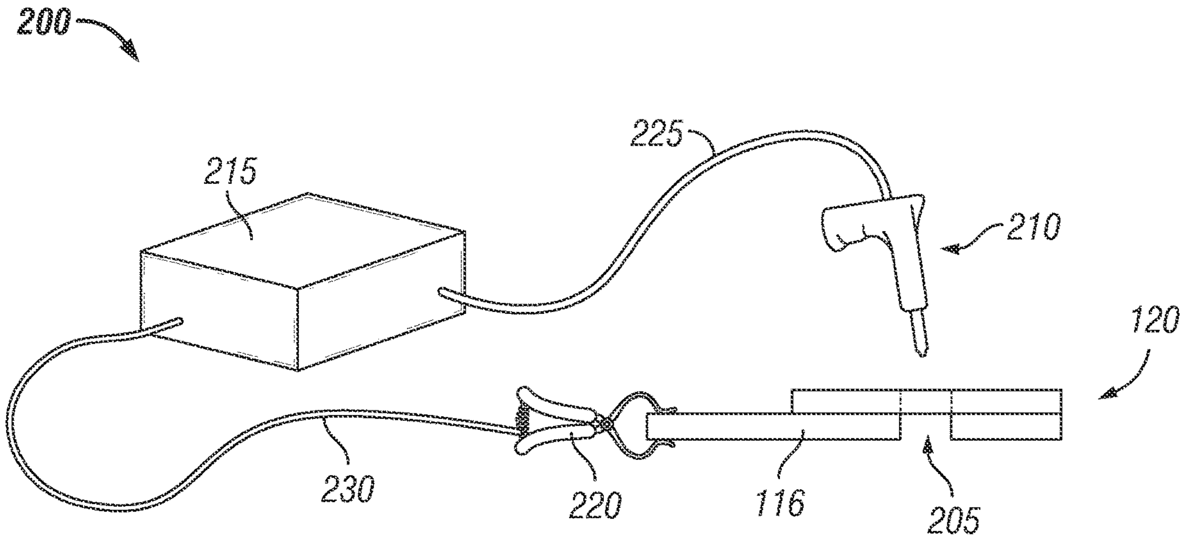
FIG. 2 illustrates an example ground detection system, according to certain embodiments.

FIG. 2 illustrates an example ground detection system 200. In embodiments, the ground detection system 200 may be configured to remove the layers and/or coatings disposed within the area over a plurality of predrilled holes 205 on the one or more panels 120 without damaging the substrate 116. The ground detection system 200 may comprise an ultrasonic cutter 210, a power source 215, and a workpiece clamp 220. In embodiments, the ultrasonic cutter 210 may be configured to remove material from a surface of a structure through high frequency, low amplitude vibrations of a tool against the material surface. Without limitations, any suitable ultrasonic cutter may be utilized as ultrasonic cutter 210 in accordance with the present systems and methods. Without limitations, the ultrasonic cutter 210 may operate at about 20 kHz to about 40 kHz. While the present disclosure relates to an ultrasonic cutter, the ground detection system 200 may be used with any suitable electrically controlled system (for example, but not limited to, a CNC mill, a robot arm with cutter, etc.). Further, while the ground detection system 200 may comprise an ultrasonic cutter 210, the ground detection system 200 may use any structure capable of cutting with a controlling functionality or performance module.

As illustrated, the ultrasonic cutter 210 may be coupled to the power source 215 via a first power cable 225. Without limitations, the first power cable 225 may be any suitable cabling, wiring, connection, and combinations thereof capable of electrically coupling the ultrasonic cutter 210 to the power source 215. Without limitations, the power source 215 may be able to supply 110 V. In embodiments, there may be a second power cable 230 coupling the workpiece clamp 220 to the power source 215. Without limitations, the second power cable 230 may be any suitable cabling, wiring, connection, and combinations thereof capable of electrically coupling the workpiece clamp 220 to the power source 215. Without limitations, the workpiece clamp 220 may be any suitable connection capable of completing an electrical circuit between the ultrasonic cutter 210, the substrate 116 of one of the one or more panels 120, and the power source 215.

Figure 3:
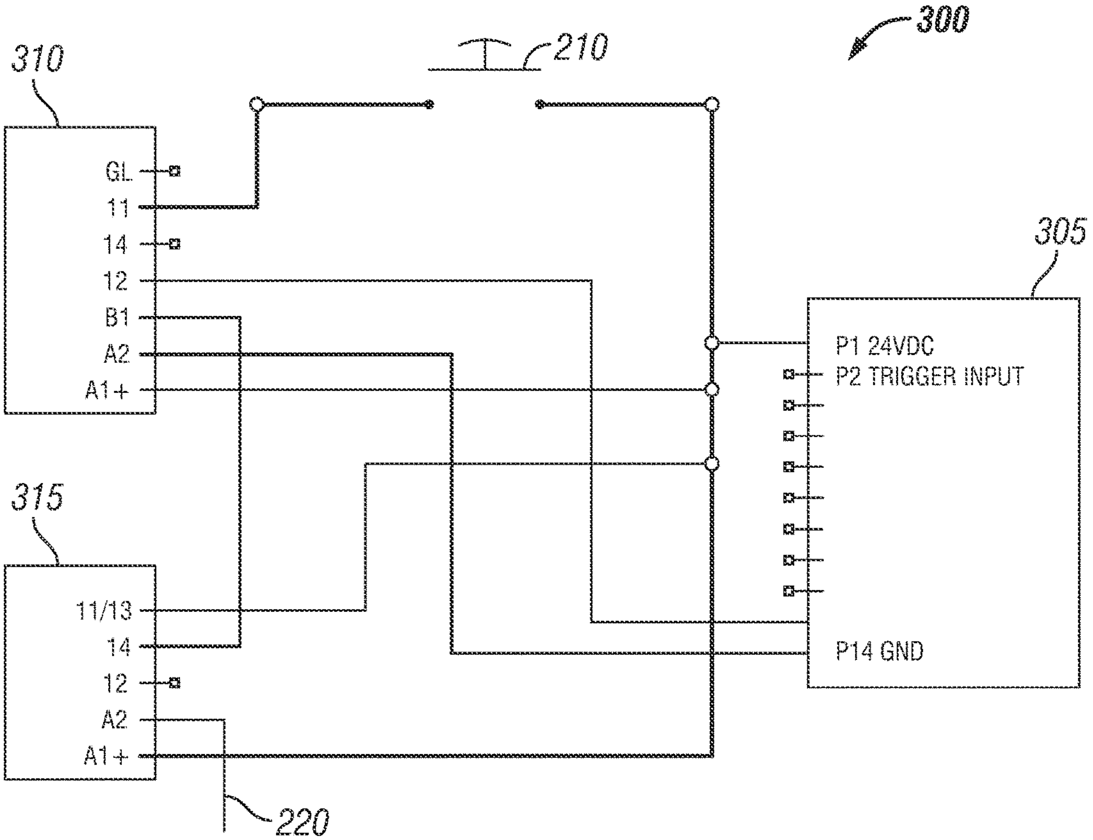
FIG. 3 illustrates an example electrical circuit, according to certain embodiments.

FIG. 3 illustrates an example electrical circuit 300 used by the ground detection system 200 (referring to FIG. 2) to prevent an operator from damaging the substrate 116 (referring to FIG. 2) of one or more panels (referring to FIG. 2). As illustrated, the electrical circuit 300 may include the ultrasonic cutter 210, a controller 305, a timer 310, and a switch 315. In embodiments, each of the components within the electrical circuit 300 may be electrically coupled to one another. In one or more embodiments, the controller 305 and the timer 310 may be disposed about the power source 215 (referring to FIG. 2). The timer 310 may be a timer relay configured to turn off the ultrasonic cutter 210 for a pre-determined amount of time. Without limitations, the timer 310 may be programmed to provide a time delay in a range of about 1 second to about 10 seconds or from about 1 second to about 3 seconds. When the timer 310 is actuated, the controller 305 may shut off the power supplied to the ultrasonic cutter 210 for the pre-determined time delay. In one or more embodiments, the timer 310 may work in conjunction with a light source and/or a sound source to alert an operator that the ultrasonic cutter 310 is temporarily turned off. In other embodiments, the timer 310 may be replaced by the light source and/or sound source. In one or more embodiments, the controller 305 may not shut off power but may actuate a light source or other suitable indicator for the operator that the specific surface has been contacted.

In embodiments, the switch 315 may be a standard on/off relay configured to open and close the electrical circuit 300. In embodiments, the electrical circuit 300 may be in an initial configuration wherein the switch 315 is in the off position. Without limitations, the switch 315 may be disposed about a portion of the ultrasonic cutter 210. While in the off position, the ultrasonic cutter 210 may be operated by normal actuation. When the ultrasonic cutter 210 comes into contact with the substrate 116, the switch 315 may be actuated to the on position. In the on position, the timer 310 may be actuated to start the time delay, thereby indicating when an operator can resume operation of the ultrasonic cutter 210 in a normal fashion. Further in the on position, the controller 305 may turn off the power to the ultrasonic cutter 210 for the prescribed time delay in accordance to the timer 310. When an operator removes the contact between the ultrasonic cutter 310 and the substrate 116, the switch 315 may be actuated back to the off position. In embodiments, as the switch 315 is actuated back to the off position, power to the ultrasonic cutter 210 may not be restored until the time delay has run for the pre-determined amount of time. Operation of the switch 315 occurs when such contact occurs to whichever layer is coupled to the electrical circuit 300 to provide grounding. With reference back to FIG. 2, the workpiece clamp 220 may be connected to the desired layer in any suitable fashion.

Controller 305 may be any processing device that controls the operations of one or more components of electrical circuit 300 and/or produces data. Controller 305 may control one or more operations of ultrasonic cutter 210 and/or timer 310. Controller 305 may determine whether a component of the electrical circuit 300 requires power and/or may initiate the distribution of power to the one or more components. Controller 305 may be hard-wired and/or wirelessly connected to ultrasonic cutter 210 and/or timer 310. Controller 305 may use one or more elements illustrated in FIG. 4.

Figure 4:
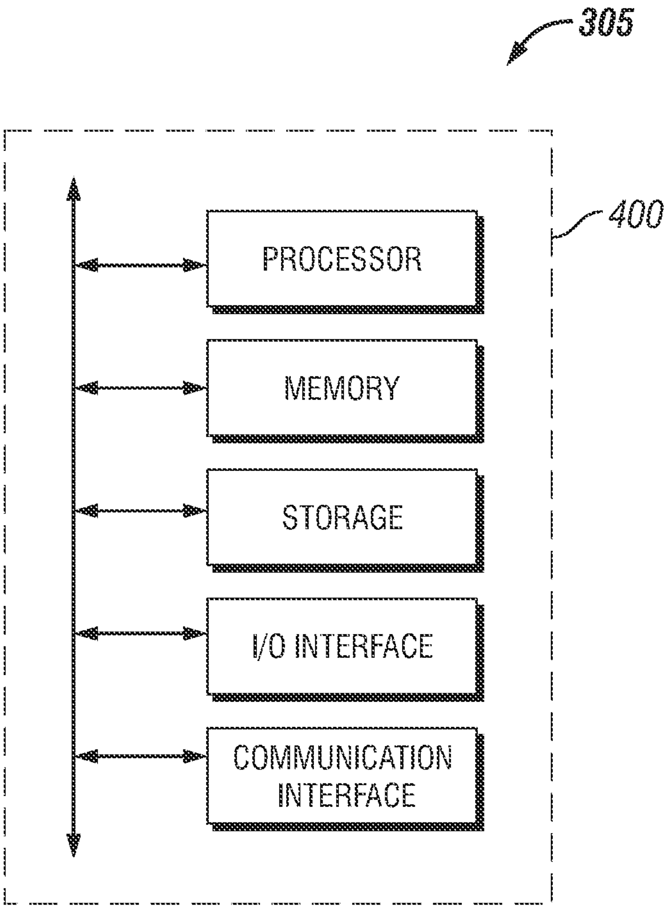
FIG. 4 illustrates a controller of the electrical circuit in FIG. 3, according to certain embodiments.

FIG. 4 illustrates an example of elements 400 that may be included in controller 305, according to certain embodiments. For example, controller 305 may include one or more interface(s), processing circuitry, memory(ies), and/or other suitable element(s). Interface receives input, sends output, processes the input and/or output, and/or performs other suitable operation. Interface may comprise hardware and/or software.

Processing circuitry performs or manages the operations of the component. Processing circuitry may include hardware and/or software. Examples of a processing circuitry include one or more computers, one or more microprocessors, one or more applications, etc. In certain embodiments, processing circuitry executes logic (e.g., instructions) to perform actions (e.g., operations), such as generating output from input. The logic executed by processing circuitry may be encoded in one or more tangible, non-transitory computer readable media (such as memory). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory (or memory unit) stores information. Memory may comprise one or more non-transitory, tangible, computer-readable, and/or computer-executable storage media. Examples of memory include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

With reference to FIGS. 2-3, the method as presented in the present disclosure may be described. An operator may utilize the ultrasonic cutter 210 to cut through coatings present on the one or more panels 120. Specifically, the ultrasonic cutter 210 may be used to remove the coatings present about the plurality of predrilled holes 205. As the ultrasonic cutter 210 is being used, a portion of the ultrasonic cutter 210 may come into contact with the substrate 116. In previous embodiments, the ultrasonic cutter 210 may have continued to cut the substrate 116. This may damage the substrate 116 and require additional costs and/or time. With respect to the present system and method, the electrical circuit 300 of the ground detection system 200 may prevent the ultrasonic cutter 210 from further actuation by turning off the power supplied to the ultrasonic cutter 210 as it comes into contact with the substrate 116. In these embodiments, the substrate 116 may have at least the first layer 117 deposited on top of it, wherein the first layer 117 is non-conductive. In these embodiments, the ultrasonic cutter 210 may be capable of passing through the first layer 117 while actively operating.

In one or more embodiments, the substrate 116 may be conductive, and the contact with the ultrasonic cutter 210 may actuate the switch 315 to complete the electrical circuit 300 when the electrical circuit is grounded to the substrate 116. In embodiments, the operator may re-position the ultrasonic cutter 210 away from the substrate 116 and continue operations after the time delay provided by the timer 310 has lapsed. After the time delay, the electrical circuit 300 may provide power to the ultrasonic cutter 210 to allow for further cutting of the coatings.

In one or more embodiments, there may be a singular layer of coating disposed on the substrate 116 (for example, first layer 117). In other embodiments, there may be a plurality of layers of coatings disposed on the substrate 116. Each of the layers of coatings may comprise conductive or non-conductive properties. The ultrasonic cutter 210 may be capable of cutting through the non-conductive layers without triggering the timer 310. If one of the layers of coatings is conductive, the timer 310 may be actuated as the ultrasonic cutter 210 contacts the conductive layer, and the power to the ultrasonic cutter 210 may be temporarily turned off, if the electrical circuit 300 is grounded to that specific conductive layer. For example, if the substrate 116 comprises the first layer 117 and the second layer 118 while the substrate 116 and the second layer 118 are conductive and the first layer 117 is non-conductive, the ultrasonic cutter 210 may be capable of cutting through the second layer 118 and the first layer 117 while stopping at the substrate 116 if the electrical circuit is grounded to the substrate 116 via the workpiece clamp 220. In certain embodiments, the ultrasonic cutter 210 may still be provided power when encountering the substrate 116, but an indication to the operator may be provided (for example, through the timer 310, a light source, a sound source, etc.) that contact with the substrate 116 has occurred. In embodiments, the electrical circuit 300 operates initially as an open circuit. When the circuit is closed by contacting the substrate 116 (or whichever layer is coupled to ground the circuit), the power to the ultrasonic cutter 210 may be turned off and/or an indication may be provided to the operator. The operator may still be able to cut through conductive layers that are not grounded to the electrical circuit 300 while the power is off, but there may need to be insulation between each layer for desired protection.

Technical advantages of this disclosure may include one or more of the following. Previous cutters have utilized a physical stopper to stop the cutter from damaging the substrate 116. The ultrasonic cutter 210 described herein may work in conjunction with the ground detection system 200 to stop operation when the conductive surface of the substrate 116 is detected through contact. This may accommodate substrates 116 which are curved because traditional cutters will stop before all the coating material has been cut. Further, this may accommodate the operator approaching the substrate 116 at an angle or changes in the thickness of the substrate 116, wherein there would be an angular gradient between different thickness regions. The present ground detection system 200 may rely on completing the electrical circuit 300 by physically connecting the ultrasonic cutter 210 to the conductive substrate 116. This may be done at any angle between the ultrasonic cutter 210 and the substrate 116.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method of detecting a substrate, comprising:
attaching a workpiece clamp to the substrate;
cutting a layer of coating disposed on the substrate with an ultrasonic cutter, wherein:
the ultrasonic cutter is electrically coupled to a switch and a controller;
the ultrasonic cutter operates at a frequency of 20 kHz to 40 kHz; and
the layer of coating is non-conductive; and
contacting the substrate with the ultrasonic cutter; wherein:
contacting the substrate with the ultrasonic cutter comprises actuating the switch; and
actuating the switch comprises instructing the controller to turn off power supplied to the ultrasonic cutter for a duration of a time delay.

2. The method of claim 1, wherein the ultrasonic cutter is electrically coupled to a timer.

3. The method of claim 2, wherein:
the timer and the controller are disposed in a power source; and
the power source is coupled to the ultrasonic cutter.

4. The method of claim 2, wherein the switch is disposed about a portion of the ultrasonic cutter.

5. The method of claim 2, wherein:
the substrate is conductive.

6. The method of claim 5, further comprising actuating the timer concurrently with actuating the switch.

7. The method of claim 6, wherein actuating the timer provides the time delay in a range of 1 second to 10 seconds to an operator of the ultrasonic cutter.

8. The method of claim 2, wherein the timer works in conjunction with a light source to alert the operator that the ultrasonic cutter is temporarily turned off.

9. The method of claim 2, wherein the timer works in conjunction with a sound source to alert the operator that the ultrasonic cutter is temporarily turned off.

10. A method of detecting a substrate, comprising:
attaching a workpiece clamp to the substrate;
cutting a plurality of layers of coatings disposed on the substrate with an ultrasonic cutter, wherein the ultrasonic cutter operates at a frequency of 20 kHz to 40 kHz; and
contacting the substrate with the ultrasonic cutter; wherein:
contacting the substrate with the ultrasonic cutter comprises actuating a switch electrically coupled to the ultrasonic cutter; and
actuating the switch comprises instructing a controller electrically coupled to the ultrasonic cutter to turn off power supplied to the ultrasonic cutter for a duration of a time delay.

11. The method of claim 10, wherein the ultrasonic cutter is electrically coupled to a timer.

12. The method of claim 11, wherein:
the timer and the controller are disposed in a power source; and
the power source is coupled to the ultrasonic cutter.

13. The method of claim 11, wherein the switch is disposed about a portion of the ultrasonic cutter.

14. The method of claim 11, wherein;
the substrate is conductive.

15. The method of claim 14, further comprising actuating the timer concurrently with actuating the switch.

16. The method of claim 15, wherein actuating the timer provides the time delay in a range of 1 second to 10 seconds to an operator of the ultrasonic cutter.

17. The method of claim 11, wherein the timer works in conjunction with a light source to alert the operator that the ultrasonic cutter is temporarily turned off.

18. The method of claim 11, wherein the timer works in conjunction with a sound source to alert the operator that the ultrasonic cutter is temporarily turned off.

* * * * *